E. NALL.
MACHINE FOR THE MANUFACTURE OF INNER TUBES.
APPLICATION FILED MAY 22, 1916.

1,285,321.

Patented Nov. 19, 1918.
7 SHEETS—SHEET 2.

Inventor
Edward Nall.

Witness

E. NALL.
MACHINE FOR THE MANUFACTURE OF INNER TUBES.
APPLICATION FILED MAY 22, 1916.

1,285,321.

Patented Nov. 19, 1918.
7 SHEETS—SHEET 6.

Inventor
Edward Nall

Witness

By

Attorney

E. NALL.
MACHINE FOR THE MANUFACTURE OF INNER TUBES.
APPLICATION FILED MAY 22, 1916.

1,285,321.

Patented Nov. 19, 1918.
7 SHEETS—SHEET 7.

Inventor
Edward Nall

UNITED STATES PATENT OFFICE.

EDWARD NALL, OF AKRON, OHIO, ASSIGNOR TO THE GOODYEAR TIRE AND RUBBER COMPANY, OF AKRON, OHIO, A CORPORATION OF OHIO.

MACHINE FOR THE MANUFACTURE OF INNER TUBES.

1,285,321.  Specification of Letters Patent.  Patented Nov. 19, 1918.

Application filed May 22, 1916. Serial No. 99,120.

*To all whom it may concern:*

Be it known that I, EDWARD NALL, a citizen of the United States, residing at Akron, in the county of Summit and State of Ohio, have invented new and useful Improvements in Machines for the Manufacture of Inner Tubes.

My present invention relates to a machine for the manufacture of inner tubes for pneumatic tires and more particularly has reference to a machine for forming inner tubes from a single sheet or ply of rubber.

As a principal object of the invention, I contemplate the provision of a machine organized from component units which are adapted to treat a continuously moving rubber sheet in accordance with successive steps in the formation of an inner tube therefrom.

To this end, I arrange an elongated platform or series of table sections over which an endless conveyer belt is adapted to travel. At one end of this structure is positioned the stock rack from which the rubber sheet is fed from successive rolls on to the conveyer belt, while at the opposite end is located the forming and pressing mechanism which transforms the sheet into a continuous tube adapted to be cut up into lengths suitable to provide inner tubes. Intermediate these terminal parts of the machine are located upon the elongated table and along the route of the conveyer belt, a number of mechanisms or appliances which are arranged to take care of the successive steps of washing, coating and drying the edges of the rubber sheet prior to its entrance into the mentioned pressing and forming mechanisms.

Aims of the invention subsidiary to the main object thereof are concerned with the provision of means for washing opposed beveled edges of a moving sheet of material, a specific embodiment of which means may comprise rotatable brushes dipping into a bath or reservoir of the cleansing fluid; the provision of complemental means for applying an adhesive coating to the washed edges of the moving rubber strip; the provision of adjustable means for regulating the width of the edge zone of the sheet which is being treated by the mentioned washing and coating mechanism; the provision of means to quickly dry the coated edges of the sheet; and the provision of a shaping tunnel to continuously roll the flat sheet into a tubular form, in conjunction with a presser roll operating upon the gummed edges of the sheet to make them adhere to each other in maintenance of the tubular form.

Further objects of my present machine are to provide means to withdraw the rubber blank from the conveyer belt temporarily during treatment by the preparing mechanisms; to provide guides to return the rubber strip to the conveyer belt after passage through any of the treating appliances; to provide an endless support guide traveling with the belt to space the lower gummed edge of the rubber strip from contact with the conveying means; to provide brush means to clean the belt itself; to provide suitable driving mechanisms for the belt, the endless guide and certain of the other treating appliances; and finally to provide a control of the machine such that it may be stopped by an operator stationed at any point along the route of the conveyer belt.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts;

Fig. 9 is a plan view of the edge-washing mechanism;

Fig. 13 is a transverse sectional view of the rubber strip prior to being formed up as a tube.

The machine which I have disclosed herein is especially designed for the manufacture of a continuous tube from a continuous flat sheet or strip blank of rubber. These flat sheets or blanks are supplied to the machine in rolls, and both sides of the sheet are thickly coated with talc or a similar chalky powder to prevent the adhesion of the several layers composing a roll. Prior to being supplied to the inner tube machine, the lateral edges of the rubber strip are oppositely beveled or skived in the manner illustrated in Fig. 13 in order that a more secure and less bulky seam or joint may result from a lapping of the beveled edge portions (Fig. 14) by the shaping tunnel, after they have been adhesively coated.

The thickly powdered condition of the rubber strip precludes, however, the immediate application of a cement to the skived edges which are later to form the tube seam, and for this reason the edges are first washed by the unit B before entering the cement coating appliance C. For both the washing and coating operations a rotatable member moves along each edge of the rubber strip and is semi-immersed in a reservoir containing a proper cleansing or coating fluid. After leaving these two primary units B and C, the rubber strip passes, upon its conveyer belt, through the quick-drying apparatus, which consists of a sectional tunnel heated by the steam pipes of the unit D.

Since the cement applied by the unit C to the beveled edges of the rubber sheet must be comparatively fluid in order to facilitate its application, it is apparent that it must be dried to a considerable extent before the seaming operation is undertaken. The steam drying apparatus D evaporates the major portion of the moisture in the cement coating but as it is difficult to regulate the temperature to secure the proper degree of dryness on the part of the coated edges, the table is elongated between the steam drying apparatus and the shaping tunnel in order that the remaining moisture in the cement coating after the passage of the strip through the apparatus C may be naturally evaporated by contact with the surrounding atmosphere during its travel over that portion of the table separating the units D and E. The natural evaporation of the edge coating depends mainly upon the two factors of the distance traveled and the rate of such travel, so that a relatively fine adjustment of the degree of evaporation is readily obtained from a combination of the forced evaporation provided by the steam tunnel and the natural evaporation gained by elongation of the conveying table.

The rubber strip having now been washed, coated and dried, enters the shaping tunnel, which automatically laps the beveled gummed edges of the strip and feeds them under the press roll completing the seaming operation. Upon issuing from the last named mechanism the achieved continuous cylinder may be cut up into suitable lengths for inner tubes.

Figures 1, 14, 15:
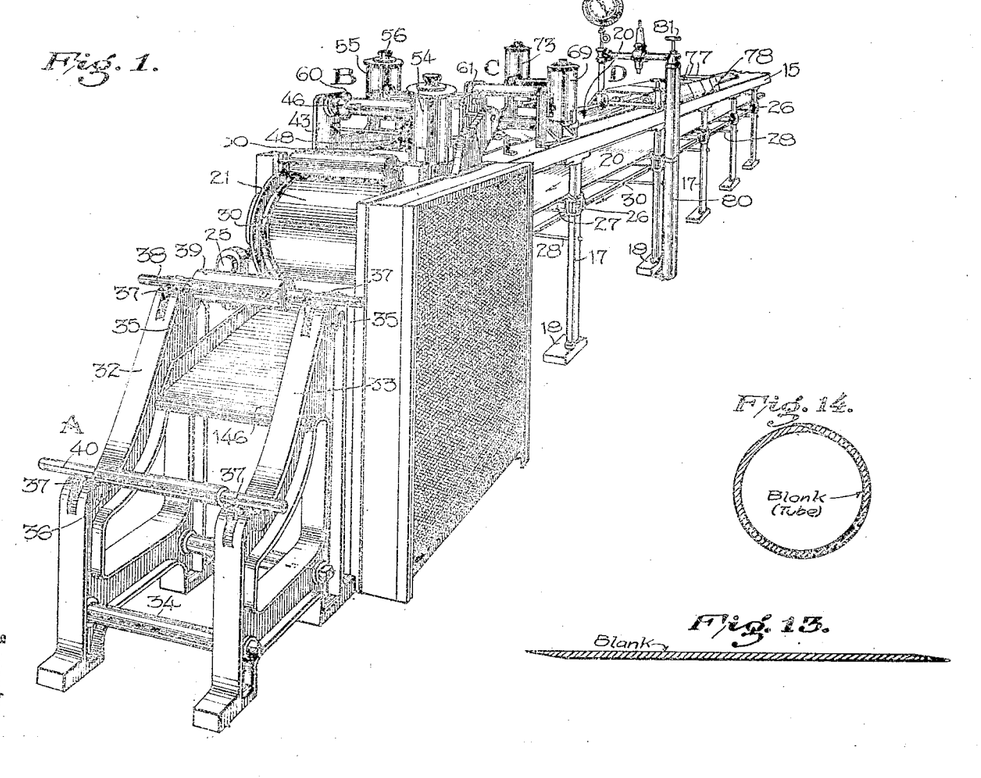
Figure 1 is a fragmentary perspective view of the machine from the starting point of the rubber strip.
Fig. 14 is a similar view showing the strip after it has been shaped into its tubular form.
Figure 2:
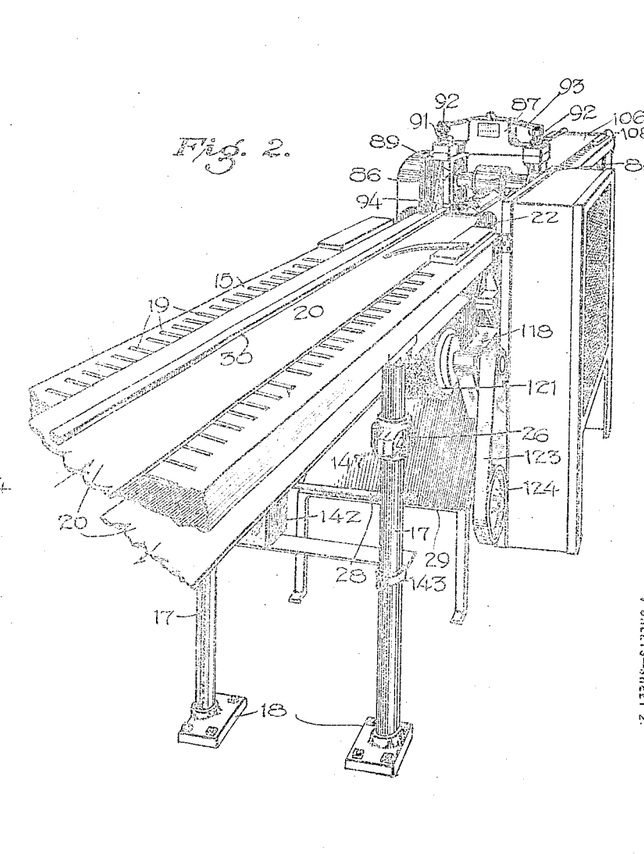
Fig. 2 is a corresponding perspective view of the opposite end of the machine.
Figure 7:
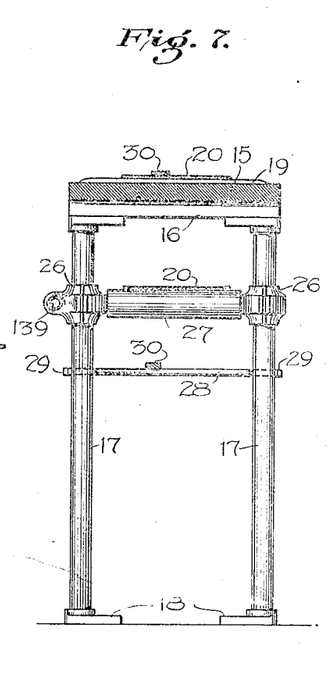
Fig. 7 is a typical cross-sectional view of the table.

With this preliminary outline, a detailed exposition of the preferred embodiment of the invention as illustrated herein will now be undertaken in the order of the operation of the unit mechanisms, reference being primarily directed, however, to Figs. 1, 2 and 7 for an initial description of the table and its appurtenances.

The table consists of a number of elongated platform sections 15 which are arranged in end to end alinement and supported by cross-bars 16 upon the upper ends of the tubular standards 17, each of which has a suitable footing plate 18 for attachment to the floor. Secured transversely upon the platform tops 15 are metallic half-round ribs 19 which exist in spaced relation for the substantially frictionless support of the conveyer belt 20. This later travels over a pair of drums 21 and 22 which are arranged at opposite ends of the table and below the level of the platform sections 15 in order that the belt may be returned therebeneath. The rear drum 22 is journaled in fixed bearings 23 arranged upon the terminal unit E, while the fore drum 21 is journaled within bearings 24 adjustably supported upon a bracket 25 projecting from the unit B, in order that the tension of the conveyer belt 20 may be readily regulated in a well known manner.

The table standards 17 are arranged in transverse pairs below the platform tops 15, each pair carrying clamp bearings 26 which support between them a roller 27 over which the conveyer belt runs in being returned below the table top from the rear drum to the fore drum. Smaller rollers 28 are also supported by pairs of the standards 17 upon trunnions 29 and serve as occasional points of support for the endless guide strap 30 which follows the course of the conveyer belt and functions in a manner to be later more fully set forth. A spool 30 at the rear of the machine and adjacent to the rear conveyer drum forms the turning point of this endless strap 30 at that portion of the machine. Forwardly, the strap passes around the conveyer drum 21, thus being given a longer path of travel than that accorded the belt. This has been found necessary to prevent binding or sticking between the strap and belt when moving in unison. The driving mechanism for the conveyer and the strap presents no unusual feature but will be briefly touched upon in connection with the description of the unit E, in its turn.

Figure 3:
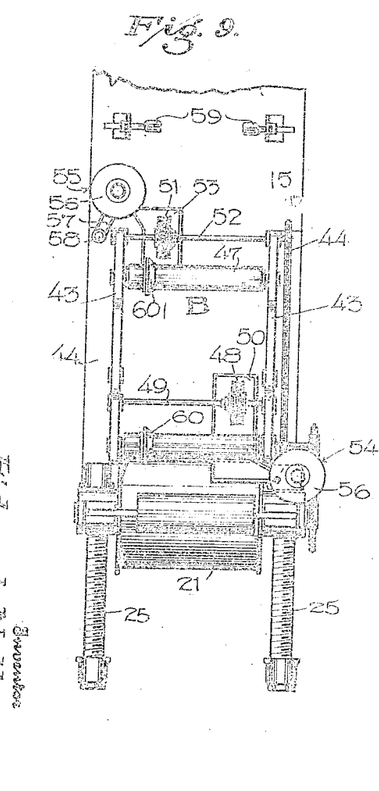
Fig. 3 is a side elevation of a portion of the machine showing the stock roll unit A and the edge-washing unit B.

Attention is now more particularly directed to Figs. 1 and 3 for disclosures of the stock roll unit A. This unit consists of a pair of side frames 32 and 33 which are connected in alinement by the tubular supports 34. Each of these frames has a pair of U-shaped bearing portions 35 and 36 upon which spaced rolls 37 are supported in pairs, as illustrated in Fig. 3. The bearing portions 35 of the frames are in alinement transversely of the upper portion of the stock rack and serve to freely support the spindle rod or shaft 38 of the roll 39, which is thus swung between the side frames. It is from this roll that the rubber strip blank is fed on to the conveying belt. Upon the rolls 37 of the transversely alined lower bearings 36 of respective side frames is supported a similar roll spindle 40 upon which a relief roll of rubber material is placed. As the upper roll is exhausted, the free end of the lower roll is spliced thereonto, and the relief roll is moved upwardly to rest upon the bearings 35, so that there is no interruption to the passage of the rubber strip through the machine, additional relief rolls being substituted upon the bearings 36 as required.

It being understood that the means for introducing the rubber blank upon the starting point of the conveyer belt has been fully set forth, it remains now to disclose the various mechanisms for treating the moving rubber strip until its final transformation into a continuous tube. First of these mechanisms is the edge-washing unit B, which is illustrated in detail in Figs. 3 and 9. As there shown, a pair of angle frames 43, each of a substantially U-shaped appearance in elevation have their bases 44 secured at the fore end of the table 15. At the lower rear portion of the frames 43 there is journaled the idler roll 45 over which the moving rubber blank travels in doubling back upon itself, later making an opposite turn about the idler roll 46, which is journaled between the frames at their upper fore portions. A roll 47 is positioned at the level of the roll 46 immediately above the first roll 45, and supports the rubber blank after it has made the complete reverse curve over the first two rolls and is to be returned to the conveyer belt 15. The moving blank is thus withdrawn from the belt temporarily for treatment in this mechanism, a proceeding duplicated in connection with the unit C.

A washing brush 48 is supported upon its shaft 49 between the fore parts of the frame to contact with the right upper edge of the rubber strip moving over the rolls 45 and 46. When the term "right upper edge" is used in connection with the operation of the brush 48, reference is made to the right beveled edge of the rubber blank, which is normally uppermost, although it has been temporarily inverted by passage over the roll 45. This arrangement is necessary to bring it in contact with the upper periphery of the brush 48, since the lower periphery thereof is semi-immersed in a reservoir 50 or bath of the cleansing fluid. A similar brush 51 is mounted by its shaft 52 in the rear portions of the frames 43 and contacts with the left lower edge of the rubber blank, as the latter passes in the normal position of the blank, over the third idler roll 47. This brush is also semi-immersed in its own bath 53.

Each of the baths or containers of a cleansing fluid, such as benzine, for instance, for the two edge-washing brushes, is a shallow open tank in connection with the main fluid reservoirs 54 and 55 respectively. The main reservoirs, which are of the constant level type are provided with removable caps 56 and are mounted by brackets 57 for pivotal movement about stationary uprights 58, in order that they may be swung with their respective tanks outwardly from the appliances B for purposes of cleaning when necessary. A pair of guides 59 direct the washed rubber blank back to the conveyer belt 15, and conical disk guides 60 are adjustable upon each of the idler rolls 45, 46 and 47 for the purposes of engaging an edge of the rubber strip so that the blank may be properly fed over the two brushes 48 and 51.

Figure 4:
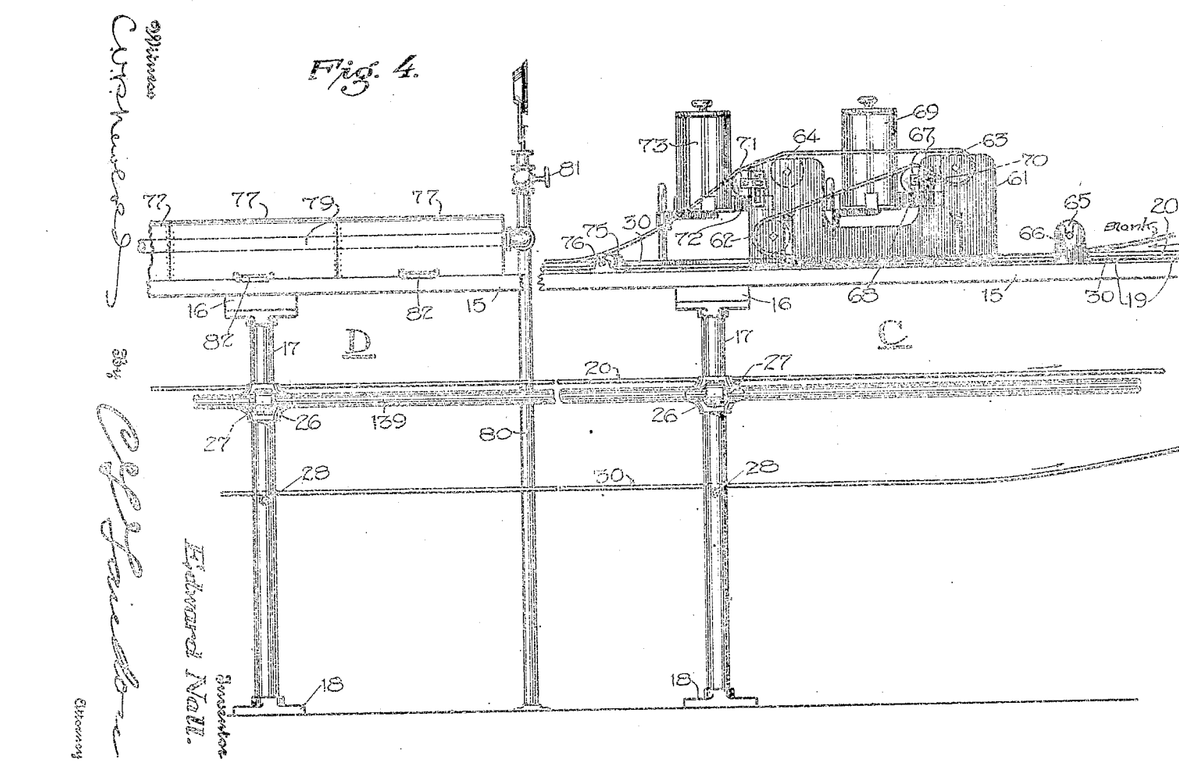
Fig. 4 is also a side elevation of a portion of the machine showing the cement coating unit C and the drying unit D.
Figures 10, 11, 12:
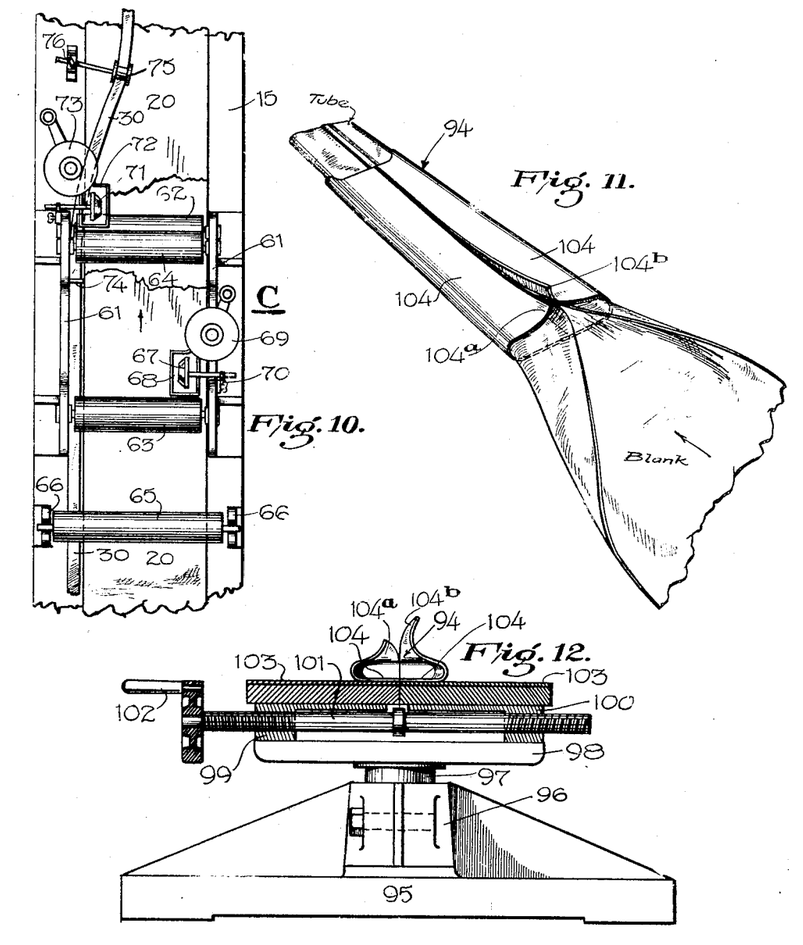
Fig. 10 is a similar view of the coating mechanism.
Fig. 11 is a detailed perspective view of the former or shaping tunnel *per se;*
Fig. 12 is an end elevational view of the shaping tunnel and its mounting.

A short portion of the table intervenes between the washing mechanism B, just described, and the adjacent cement applying apparatus C. This latter is illustrated in Figs. 4 and 10 and is of the same general character as the edge-washing unit, side plates 61 being secured upon the table for the support of various rolls. Three idlers denoted by the numerals 62, 63 and 64 occupy substantially the same position as their prototypes in the washing unit and serve to give a similar reversed curved course of travel to the rubber blank in its passage through the appliance. A roller 65 is mounted loosely in a pair of bearings 66 to extend across the table immediately before the mechanism to insure the entrance of the rubber blank flatwise upon the conveyer strip, and to prevent the blank from becoming taut between the last roller 47 of the unit B and the first roller 62 of the unit C. Arranged to contact with the right upper edge of the rubber strip (in its inverted position between the idlers 62 and 63) is the coating disk 67, which is semi-immersed in a suitable adhesive fluid contained within the bath 68. This bath is in communication with a reservoir 69 of the same type, in construction and mounting, as the reservoirs 54 and 55 employed with the washing unit. The applying disk 67 is mounted upon a shank 70 which is adjustably supported in any desirable manner upon the adjacent side frame 61. A similar arrangement of coating means, including the applying disk 71, bath 72 and reservoir 73 is arranged at the rear end of this apparatus for operation upon the left lower edge of the rubber strip immediately after the latter has passed over the third idler 64, in its normal position.

It is now time to describe the function of the strap 30, which travels along the circuit of the conveyer belt 20 and at the left hand side thereof, as determined by a guide-hook 74 secured (Fig. 10) to the left frame 61 of the coating mechanism. Positioned rearwardly beyond this unit is a roller guide 75, which extends over the conveyer belt and at an angle thereto which may be regulated by the adjustable mounting 76. This roller guide contacts with the strap 30 and deflects it from its previous straightaway path of travel at the left of the conveyer to a position slightly left of the longitudinal center of the belt 20. The guide 75 is thus arranged, as shown in Fig. 4, below the freshly coated rubber blank as the latter is diagonally returned from the idler roller 64 to the belt, and the strap 30 is accordingly interposed between the left side of the rubber blank and the conveyer. This prevents the freshly coated lower edge of the rubber blank from coming in contact with the belt proper. The strip maintains this position throughout the remainder of its forward travel.

The next unit preparing the rubber strap for its final forming into a continuous tube is the drier D, which is arranged immediately in the rear of the coating appliances. The drier consists of a number of tunnel sections 77 which are independently pivoted by hinges 78 to the table top and normally arched thereover to provide an inclosure for heating pipes 79, which may be connected, as indicated at 80, to any suitable source of steam, hot water or hot air supply; controlling valves 81 of any customary nature being employed in connection therewith. Each of the tunnel sections 77 is provided with its handle 82 so that the operator may throw any or all of them back upon their hinges and so regulate the length of the heating tunnel and consequently the degree of evaporation of the adhesively coated rubber strip edges.

The method of washing, coating and drying the beveled edges of the rubber blank having now been fully set forth, reference will be had to the former and presser mechanisms which are adapted to seam the continuous blank into a continuous tube by lapping the treated edges. These mechanisms are contained within the unit E, illustrated in Fig. 5 as positioned at the rear extremity of the table 15 and at the turning point of the conveyer belt and strap. This unit also contains the driving mechanism for the entire machine.

Figure 5:
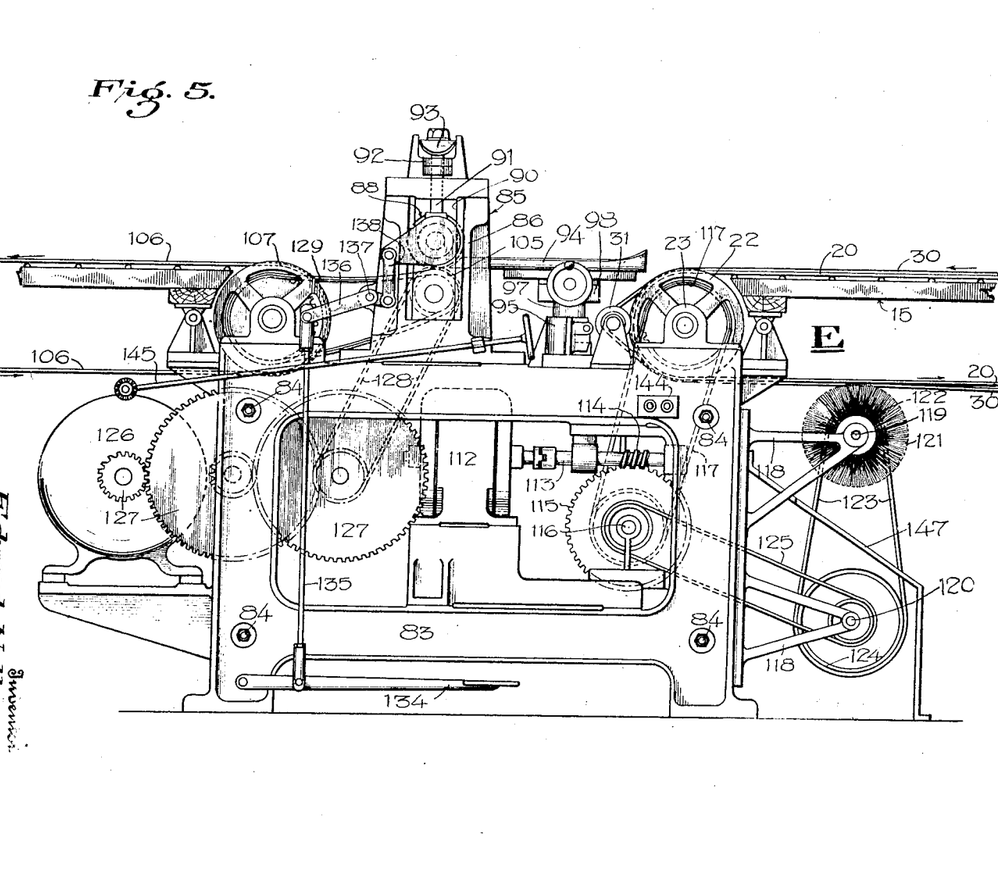
Fig. 5 is a view in side elevation of the tube forming and pressing unit E.

Unit E consists primarily of a pair of base frames 83 which are connected in transverse alinement at a number of points 84. Erected upon the two base frames is the structure 85 comprising a pair of pedestals 86 cross-connected by a member 87, the central portion of which is built up higher than the ends. A relatively heavy pressing roll 88 is journaled in bearings 89 slidable in suitable ways 90 formed within opposite pedestals 86. Each of the bearings 89 carries a rod 91 which projects upwardly through the ends of the element 87 and is fitted with an adjustable cap piece 92. Transversely supported by the built up center of the element 87 is a leaf spring 93, which acts upon the extremities of the bearing rods 91, serving to augment the force with which the roll 88 is pressed downwardly by gravity. This structure forms the basis for the use of the term "power-operated" in connection with the claiming of the presser roll.

Extending between the roll 88 and the drum 22, which terminates the rear extremity of the conveyer 20 is the shaping tunnel 94, which is mounted upon the base sections 83 of this unit in the manner best illustrated by the detailed Fig. 12. A support base 95 extends between the base frames and is formed with a center socket 96 to accommodate a pedestal 97 upon which latter is positioned a bearing plate 98. Divergently or convergently movable upon the plate 98 is a pair of oppositely adjustable sections 99 and 100, which may be commonly and equally operated by manipulation of the screw shank 101, oppositely threaded extremities of which engage the adjusting sections 99 and 100. A suitable handle 102 is provided for operation of this shank. Carried by the adjusting sections 99 and 100 and movable therewith are a pair of plates 103 upon each of which is supported one of the shaping tunnel portions 104. These last named portions are essentially semi-oval in cross-section in substantially the configuration of a flattened tube, and compose the former 94 their functions being to lap over the opposite edges of the rubber blank when the latter is fed therethrough.

The entrance mouth of the shaper is relatively large and the respective portions 104 are formed with the upcurved lips 104ª and 104ᵇ by a twisting of the entrant edges of the portions 104 out from the flattened tubular shape to provide the wider mouth. From its mouth the shaper tapers rearwardly along its sides, the dimensions of the entire oval at the exit end of the tunnel being those of the finished inner tube; and the shaper being enlarged forwardly both laterally and in the vertical manner providing the up-twisted lips 104ª and 104ᵇ, the latter lip having the greater curvature of twist. With a shaper of this form the wider rubber blank has its edge portions rolled over the body portion by easy degrees in the manner well shown in Fig. 11 until the coated edges are lapped into immediate juxtaposition just prior to issuing from the tunnel and between the pressing roll 88 and the coacting base roller 105, which together perform the operation of seaming the tube into its flattened tubular form.

Figure 6:
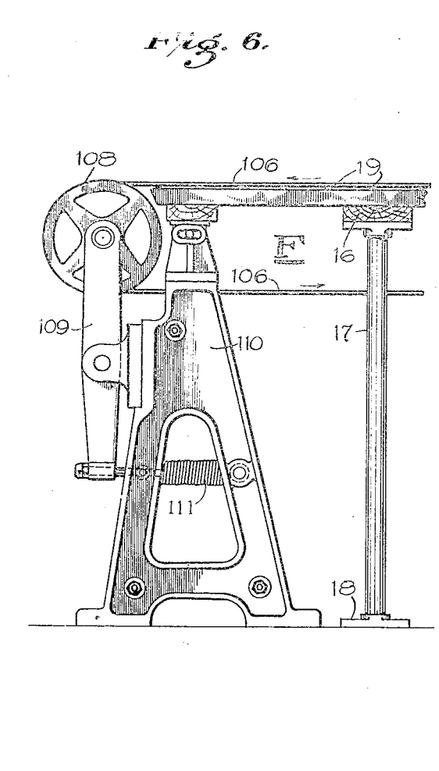
Fig. 6 is a side elevation of the terminal unit F by which the lengths of tubing are removed from the machine.

It will be apparent from the above description that the continuously moving rubber blank is transformed into a continuous tube by the automatic operation of this unit E. As the tube issues from between the rollers 88 and 105, it is laid on to a terminal conveyer belt designated by the numeral 106 and traveling over a pair of drums 107 and 108, which are journaled in suitable bearings respectively supported by the unit E and by the terminal stand F. The bearings for the drum 108 are carried at the upper extremities of lever arms 109 which are intermediately pivoted to respective side frames 110 composing the terminal stand F. At their free extremities these lever arms are connected to contractile springs 111, which are also carried by the respective side frames, and serve to maintain the tension upon the conveyer belt 106. The terminal conveyer is provided for an operator whose duty it is to cut up the continuous tube issuing from the unit E into lengths suitable for inner tubes, the tube lengths being dropped by the conveyer 106 into a suitable container from which they may be secured by a second operator whose duty it is to determine their weight and to store them in readiness for curing.

As has been previously mentioned, the driving mechanism for the entire machine is contained within the unit E. The motor 112 is mounted between the base frames 83 and drives a shaft 113 upon which is carried the worm 114. The latter has engagement with the worm wheel 115 whereby the countershaft 116 may be continuously driven. Sprockets carried at the extremities of this shaft and of the shaft for the drum 22 have trained thereover a suitable chain 117 which serves to drive the elongated conveyer 20. A pair of brackets 118 project forwardly from the frames of the unit E and mount shafts 119 and 120 respectively. On the former is carried the cleansing brush 121, which is arranged in contact with the exterior surface of the conveyer 20 and serves to clean it from all accumulation of powder, cement, etc. A belt pulley 122 is carried upon the brush shaft and driven by the belt 123 from the belt wheel 124 carried by the shaft 120, the latter being continuously driven by a suitable belt connection 125 extending therebetween and the countershaft 116.

A second motor 126 has suitable reduction gearing designated generally by the numeral 127, which is placed in train, by the sprocket drive 128, with the base roll 105 of the presser mechanism. A chain drive 129 connects the shaft of roller 105 with the shaft of the terminal conveyer drum 107 for the drive of the shorter conveyer 106.

At the fore end of the table 15 is the drum 21, which receives its motion from the motor 112 through the conveyer belt 20, and has drive chain connections 130 with a sprocket 131 mounted for adjustment in guides 132 in accordance with the adjustment of the drum 21 upon its bracket 25. A second sprocket 133 is mounted for movement with the sprocket 131 and has chain drive connection with the fore brush shaft 49, the drive connections also continuing from the latter to the rear brush shaft 52. This concludes the description of the entire driving mechanism of the machine since it is not necessary to drive the cement coating rollers 71, the contact of these with the moving rubber blank being sufficient to properly actuate these rollers.

In the operation of the machine as thus organized, a workman takes his place near the fore end of the table 15, in order to insure the uninterrupted delivery of the rubber blank stock to the conveyer belt, and also to oversee the various adjustments whereby the proper edge width of the rubber blank is washed and gummed. His duties also include the filling of the reservoirs for the washing and coating mechanisms and the care of the heating tunnel, the sections 77 of which may be removed on their hinges to provide a shorter tunnel where desirable. A second operator with a measuring stick takes his place along the conveyer and in the rear of the heating tunnel. It is his duty to mark the continuous rubber blank off into the proper lengths for inner tubes, and also to mark at one spot for each tube length the point where the valve patch is to be later applied. A third operator takes his stand in the vicinity of the unit E and slips a valve patch onto the proper spots, as located by the second operator, just as the tube enters the shaper or shaping tunnel 94. The pressing rollers apply this patch firmly to the inner portion of the tube seam. A fourth operator takes his stand near the conveyer 106 and wields a suitable cutting instrument to cut the continuous tube issuing from the presser rolls up into the tube lengths marked by the second operator. The last operator secures the tube lengths from the conveyer 106, or the container into which such conveyer empties the tubes, weighs them and stores them on suitable racks to await curing.

Whenever the machine is stopped to correct any fault that may arise in the production of the tubes, the first operator immediately throws back all of the tunnel sections 77, in order that the portion of the rubber blank resting over the heat will not be unduly dried. The shaper operator also depresses a suitable lever 134, which is pivoted to one of the frames 83 of the unit E and operates, through a connecting rod 135 the arm 136 of a crank shaft 137 secured transversely of the structure 86 and adapted to move upwardly by suitable crank arm connections 138 the bearings 89 mounting the heavy seam roller 88. This is done against the action of the leaf spring 93 and prevents what might be a permanent distortion of the tube portion, which rests between the pressing rollers.

Figure 8:
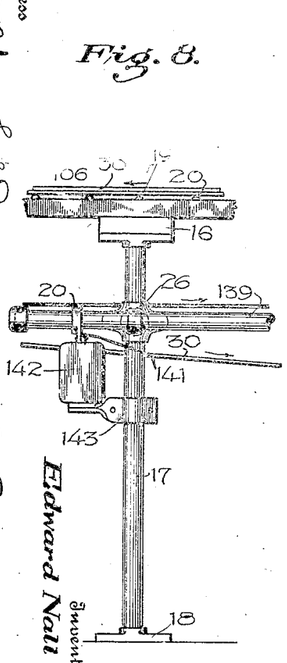
Fig. 8 is a detail of the control box.

Stoppage of the machine by an operator at any point along the table 15 is accomplished through the medium of the control bar 139, which is rotatably maintained in the brackets 26 of the table standards 17 throughout the length of the table. At one extremity of this bar a sleeve arm 140 is carried, which has connections with the operating arm 141 of the control box 142, which is supported by brackets 143 upon the table standards nearest the unit E (Figs. 2 and 8). Operation of the arm 141 serves to break connections for the two motors 112 and 126. The machine may be restarted by the usual push button mechanism maintained in the box 144 arranged upon one of the frames of the unit E. Means are also provided to control the speed of the motor 126 in accordance with the motor 112, such means being generally illustrated as including the control rod 145, and as being of a type so well known as not to require exposition. Mention may here be made of the apron 146 provided between units A and B and of the similar apron 147 placed below the brush 121 to receive the talc which may be scattered from the stock roll or from the conveyer 20.

From the foregoing recital of operations, and from the detailed description preceding such recital, it should be apparent that disclosures have been made of this invention capable of attaining all of the objects previously set forth.

What I claim is:

1. In a machine organized for the manufacture of inner tubes, means for applying an adhesive coating to the upper surface of one side portion and to the under surface of the other side portion of a flatwise rubber blank in continuous movement; and stationary means adapted to receive the flatwise blank and to lap its coated side portions to form a seam and thereby produce a continuous tube as the blank is passed therethrough.

2. A machine organized for the manufacture of inner tubes, having means for coating with an adhesive material the edge portions of a ply of rubber material in flatwise state, said means including separate devices for applying the adhesive material to opposite surfaces of the side portions.

3. In a machine organized for the manufacture of inner tubes, means for applying adhesive coatings to a flat rubber blank; means for partially drying said coatings; and means for forming the blank into a flattened tubular shape to be maintained by coincidence of said coatings, said last mentioned means being adapted to act upon the blank subsequent to the application of the adhesive coatings thereto.

4. In a machine organized for the manufacture of inner tubes, means for successively washing, cementing and drying the edges of a rubber blank; and means for lapping said blank edges to form a permanent seam.

5. In a machine organized for the manufacture of inner tubes, means for washing, cementing and drying a continuously moving rubber blank; and means for forming the blank into a tube without interrupting the movement of the blank.

6. In a machine organized for the manufacture of inner tubes, means for applying adhesive coatings to opposite surfaces of oppositely beveled edge portions of a flatwise rubber blank; and means for lapping said blank edge portions upon themselves to form a permanent seam.

7. In a machine organized for the manufacture of inner tubes, means for washing opposite edges of a rubber blank; means for coating the washed edges of said blank with an adhesive; and means for lapping said blank edges to form a permanent seam.

8. In a machine organized for the manufacture of inner tubes, means for washing opposite edges of a rubber blank; means for coating the washed edges of said blank with an adhesive; means for drying the coated edges of said blank; and means for lapping said blank edges to form a permanent seam.

9. In a machine organized for the manufacture of inner tubes, means for continuously moving a rubber blank; means for applying a continuous adhesive coating to said blank; means for forming the blank into a seamed tube; and means including a heating apparatus in the path of travel of said blank in advance of the forming means to obtain a predetermined degree of evaporation of said coating, said apparatus being relatively remote from the forming means whereby additional evaporation and consequent drying of the coating is accomplished by prolonged exposure to the atmosphere at normal temperatures.

10. In a machine organized for the manufacture of inner tubes; a conveying element for continuously transporting a rubber blank; means for applying a treating preparation to the blank; and means for temporarily removing portions of said blank from said element as a preliminary to the application of the treating preparation.

11. In a machine organized for the manufacture of inner tubes, a conveying element for continuously transporting a rubber blank; means for doubling portions of said blank back from the carrying element and upon the remainder not removed from said conveying element; and means for washing and adhesively coating the edges of said blank when doubled back from said conveying element.

12. In a machine organized for the manufacture of inner tubes, a conveying element carrying a continuous rubber blank; means for temporarily withdrawing moving portions of said blank from the conveying element to coat the normally upper edge of the blank; and means for returning the coated blank to the conveying element.

13. In a machine organized for the manufacture of inner tubes, a conveying element carrying a continuous rubber blank; means for temporarily withdrawing moving portions of said blank from the conveying element to coat the normally lower edge of the blank; and means for returning the coated blank to the conveying element.

14. In a machine organized for the manufacture of inner tubes, a conveying element carrying a continuous rubber blank; means for withdrawing a moving portion of the blank from the conveying element; means for applying an adhesive coating to an upper and a lower edge of said blank; and means for returning the coated blank to the conveying element.

15. In a machine organized for the manufacture of inner tubes, a conveying element for transporting a continuous rubber blank; means for withdrawing a moving portion of the blank from the conveying element; means for applying an adhesive coating to an upper and a lower edge of said blank diagonally opposite in a cross-section of the blank; means for returning the coated blank to the conveying element; and means for spacing the coated lower edge of the blank from the element.

16. In a machine organized for the manufacture of inner tubes, a conveying element for transporting a continuous rubber blank; an endless guide moving in conjunction with said conveying element; means for withdrawing a moving portion of said blank from the conveying element; means for applying an adhesive coating to the withdrawn blank portion; means for returning the coated portion to the element; and means shifting the path of said endless guide at the point of return of said blank to the conveying element to interpose the guide between the blank and conveying element.

17. In a machine organized for the manufacture of inner tubes, a conveying element for transporting a continuous rubber blank, rollers mounted above the conveying element and adapted to withdraw said blank therefrom in a reversely curved path; reservoirs containing a cleansing fluid in juxtaposition to said rollers; and a pair of brushes semi-immersed in respective reservoirs and adapted to contact with diagonally opposite upper and lower edges of said blank.

18. In a machine organized for the manufacture of inner tubes, a conveying element for transporting a continuous rubber blank, mechanisms spaced along the path of said conveying element for respectively washing the edges of the rubber blank and applying adhesive coatings thereto; and roller means contained in each of said mechanisms for withdrawing said blank from the conveying element in a reversed curve and for returning the blank thereto in a normal position.

19. In a machine organized for the manufacture of inner tubes, a conveying element for transporting a continuous rubber blank, mechanisms located at points along the path of said conveying element for respectively washing the edges of said blank and applying adhesive coatings thereto; and means contained by each of said mechanisms for temporarily withdrawing the moving blank from the conveying element.

20. In a machine organized for the manufacture of inner tubes, a conveying element for transporting a continuous rubber blank, mechanisms located at points along the path of said conveying element for respectively washing the edges of said blank and applying adhesive coatings thereto; means contained by each of said mechanisms for temporarily withdrawing the moving blank from the conveying element; and means guiding the return of the withdrawn blank to said conveying element.

21. In a machine organized for the manufacture of inner tubes, a conveying element for transporting a continuous rubber blank; heating elements extending over a portion of said element for evaporation of the moisture in the moving blanks and removable means for inclosing said heating elements and the portions of the blank passing therethrough.

22. In a machine organized for the manufacture of inner tubes, a conveying element for transporting a rubber blank; drying means arranged in proximity to the moving blank and element; and a sectional inclosing tunnel for said drying means, and the blank portions passing therethrough, each of the sections of said tunnel being independently movable out of its inclosing position.

23. In a machine organized for the manufacture of inner tubes, a conveying element; means positioned at one extremity of said element for feeding a continuous flat blank thereonto; means at the other extremity of said conveying element to curl opposite edges of successive blank portions into a flattened tubular form; and mechanisms stationed along the path of said element to prepare the blank received from the first said means for operation thereupon by the second said means.

24. In a machine organized for the manufacture of inner tubes, a conveying element; means located at one extremity for feeding a flat rubber blank therethrough; means located at the opposite extremity of said conveying element for continuously forming the blank into a tubular shape; and mechanisms intermediately located in the path of said conveying element to wash, cement and dry the blank received from the feeding means and prior to the operation of said forming means.

25. In a machine organized for the manufacture of inner tubes, a conveying element; means for feeding a flat rubber blank onto said element; means straddling said conveying element to wash the edges of the blank; means straddling the conveying element to apply adhesive coating to the blank edges; means straddling the conveying element to evaporate the moisture of said coating; and means in alinement with said conveying element for receiving the blank therefrom and shaping it into a continuous tube.

26. In a machine organized for the manufacture of inner tubes, a conveying element; means for feeding a flat rubber blank onto said element; unit mechanisms positioned along the course of said conveying element to successively wash, coat and dry the edges of the moving rubber blank; forming means in alinement with said conveying element to shape the blank into a continuous tube; and power operated mechanisms for seaming a tube issuing from said forming element.

27. In a machine organized for the manufacture of inner tubes, a former adapted to receive a relatively wider and flatwise continuous rubber blank and to lap the edges of the blank in its passage therethrough; a driven roll receiving the blank issuing from said former; a presser roll coacting with said driven roll to seam the edges of the blank; means affording an adjustable resilient contact between said presser and driven rolls; and means for separating the two rolls against the action of said resilient means.

28. In a machine organized for the manufacture of inner tubes, a conveying element for transportation of a continuous rubber blank; means to coat one of the under edges of the blank; a support guide traveling along with the conveying element and initially separate therefrom; and means deflecting the guide over onto the conveying element to receive the coated blank and to space the mentioned under edge thereof from the element.

29. In a machine organized for the manufacture of inner tubes, a conveyer carrying a continuous rubber blank; a support guide traveling along with the conveyer; means determining a partial path for the guide distinct from the path of the conveyer; means to form the guide so that the remainder of its path coincides with the path of the conveyer; means to temporarily withdraw the blank from the conveyer in order to coat its under edge; and means to return the blank toward the conveyer, the last mentioned means disposing the coated blank upon the deflected guide with the coated edge in spaced relation to the conveyer.

30. In a machine organized for the manufacture of inner tubes, a conveying element for transporting a continuous rubber blank; rolls having the blank trained thereover in temporary and partial removal from the conveying element; mechanism to treat the edges of the blank when removed from the element and means to adjustably mount the treating mechanism to adapt the latter for treating edge zones of various widths on the blank.

31. In a machine organized for the manufacture of inner tubes, means carrying a continuous rubber blank; reservoirs containing treating fluid; treating mechanisms contacting with the edges of the blank and baths immersing the treating mechanisms and in communication with respective reservoirs, whereby the treating fluid in the bath is maintained at a constant level.

In testimony whereof I have signed my name in the presence of two subscribing witnesses.

EDWARD NALL.

Witnesses:
 Geo. W. Rogers,
 C. V. P. Newbold.